Sept. 8, 1970  H. R. SPARKS  3,527,279
LOCKWASHER
Filed June 3, 1968  3 Sheets-Sheet 1
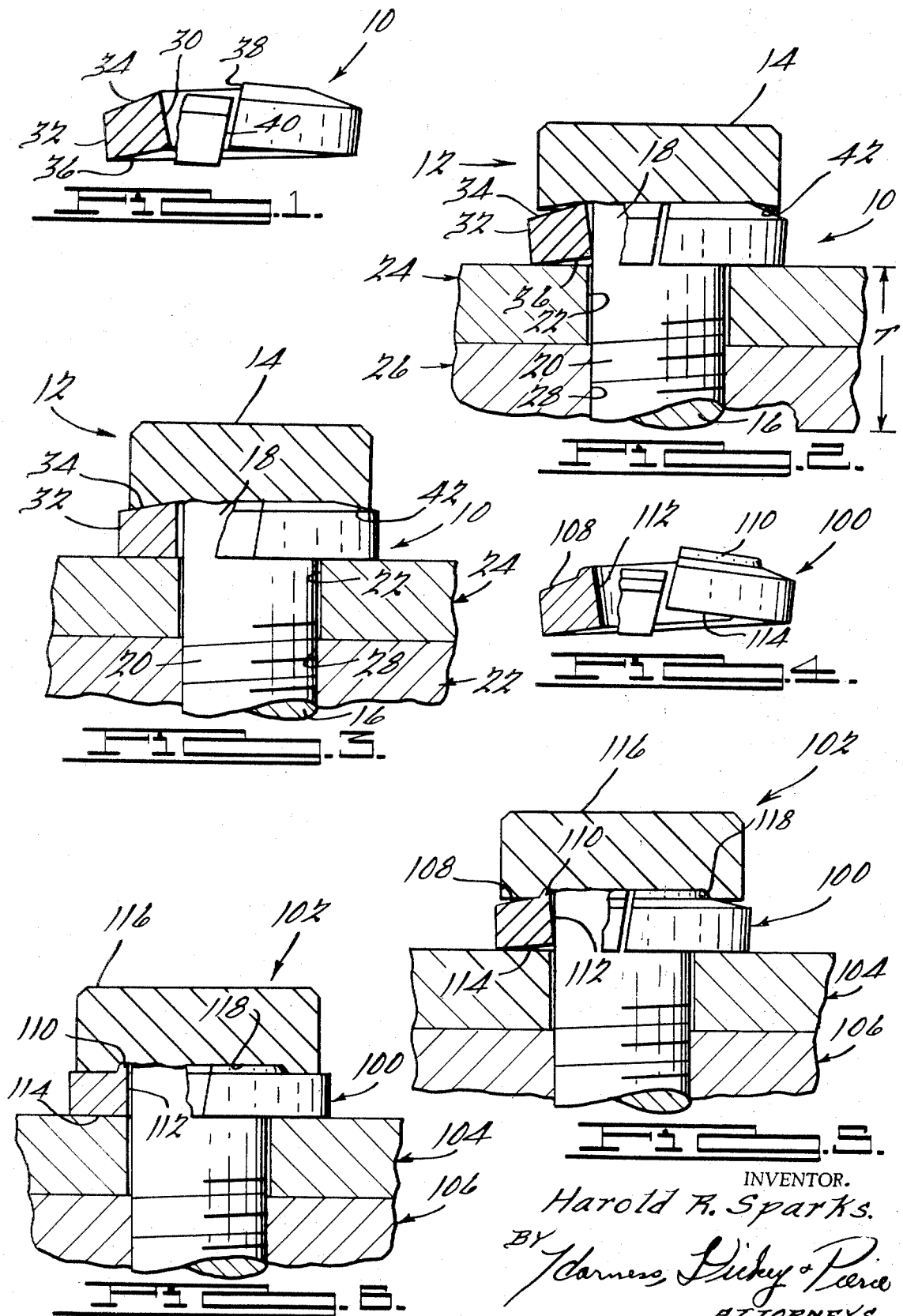
INVENTOR.
Harold R. Sparks.
BY Carness, Dickey & Pierce
ATTORNEYS.

INVENTOR.
Harold R. Sparks.
BY Harness, Dickey & Pierce
ATTORNEYS.

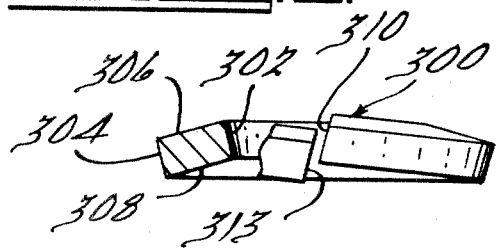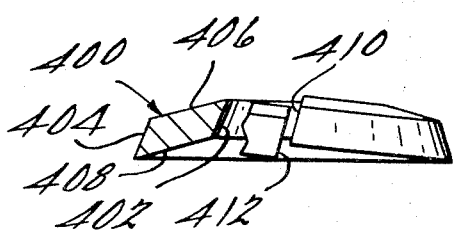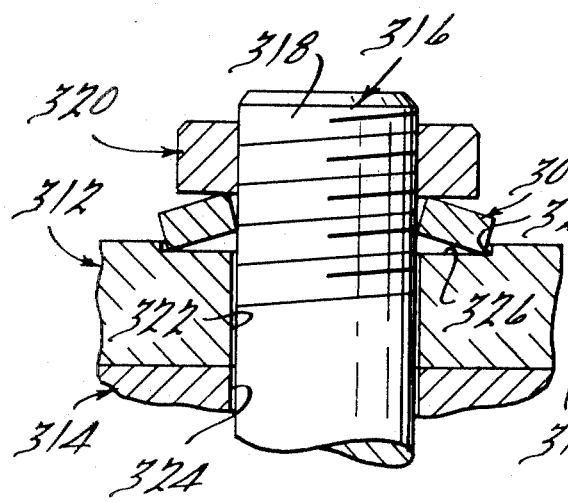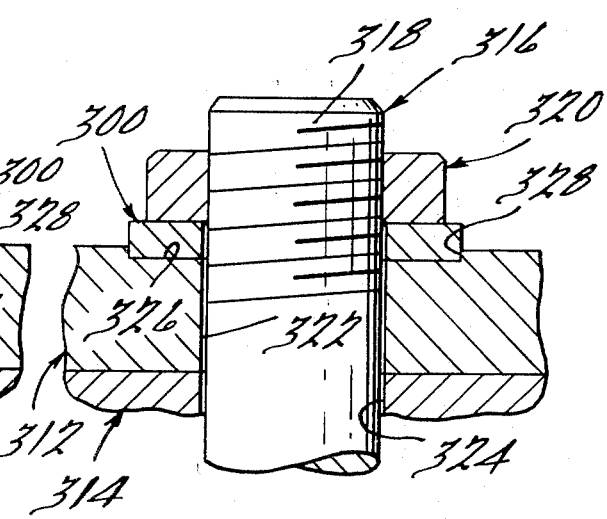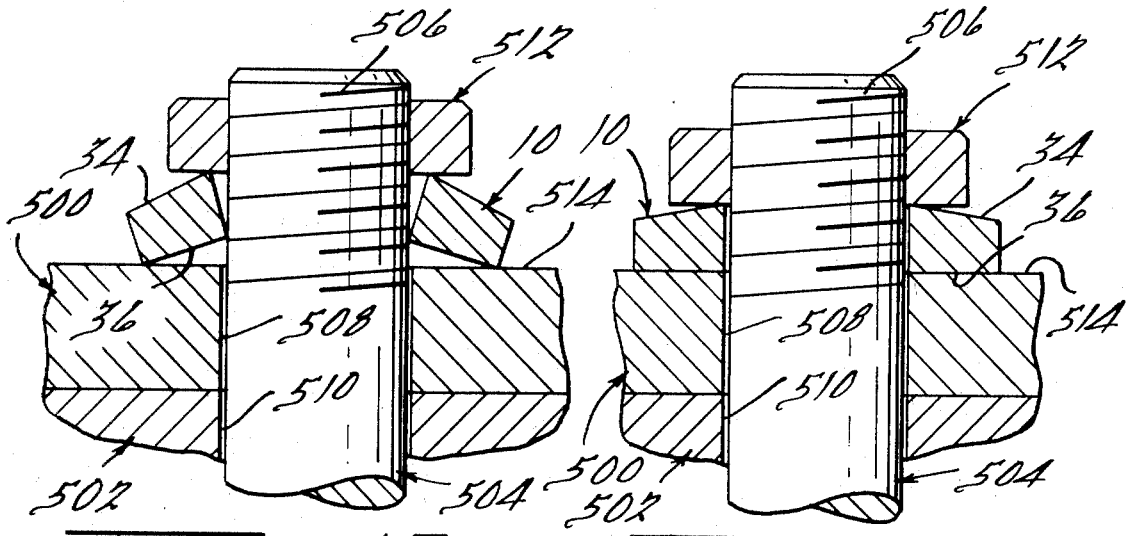

United States Patent Office 3,527,279
Patented Sept. 8, 1970

3,527,279
LOCKWASHER
Harold R. Sparks, Phoenix, Ariz., assignor to Knocke and Associates, Inc., Birmingham, Mich., a corporation of Michigan
Continuation-in-part of application Ser. No. 503,550, Oct. 23, 1965. This application June 3, 1968, Ser. No. 734,117
Int. Cl. F16b 39/24, 39/26
U.S. Cl. 151—36                      13 Claims

ABSTRACT OF THE DISCLOSURE

A lockwasher comprising a length of wire of substantially trapezoidal or parallelogram cross section formed into a helical configuration, the lockwasher having a radially directed slit at a predetermined angle to the axis thereof, whereby the ends of the lockwasher define inclined abuttingly engageable surfaces, the lockwasher having radially spaced inner and outer surfaces inclined relative to the axis thereof, and axially spaced upper and lower surface portions inclined radially inwardly and upwardly toward the axis thereof, whereby the lockwasher originally assumes a helical configuration but upon tightening of an associated bolt, stud, nut, or the like, the helix of the lockwasher is removed and the lockwasher assumes a generally conical configuration and is thereby adapted to exhibit the superior tightening characteristics of a conical lockwasher.

SUMMARY OF THE INVENTION

This invention relates generally to lockwashers of the type adapted to be interposed between a bolt head or nut and the adjacent surface of an associated workpiece, and which functions to exert a resilient force against the head of the bolt or the nut to maintain the fastener load applied by the bolt to the workpiece. More particularly, this invention relates to a novel split helical conical lockwasher which is particularly adapted for applications of the above character. This application is a continuation-in-part of United States patent application, Ser. No. 503,550, filed Oct. 23, 1965, for "Lockwasher," now abandoned.

It is a general object of the present invention to provide a novel lockwasher which exhibits the desirable characteristics of both helical and conical type lockwashers.

It is a more particular object of the present invention to provide a new and improved lockwasher which exhibits the superior locking characteristics of conical lockwashers and the desirable cost advantages provided by helical lockwashers. That is, the lockwasher of this invention provides the superior locking action of conical lockwashers but is adapted to be manufactured from wire stock on a conventional helical washer coiling machine rather than being stamped out from flat strip stock, as is the case with conventional conical lockwashers, thereby minimizing material waste and tool maintenance to the extreme.

It is another object of the present invention to provide a novel lockwasher of the above character which is adapted to be preassembled on the shank of an associated fastening means, such as a bolt, stud, or the like, by elastic expansion of the washer, and be maintained thereon by a slight interference fit with the threaded portion of the bolt or stud, thereby obviating the heretofore known practice of rolling threads on the associated fastening means after the lockwasher has been assembled thereon.

It is still another object of the present invention to provide a novel lockwasher of the above character wherein the split ends of the washer are cut at a predetermined complementary angle and abut or cam against one another upon tightening of the associated fastening means.

It is a further object of the present invention to provide a novel lockwasher of the above character whose upper side, when flattened, is complementary in shape with respect to the adjacent side of an associated fastening means, whereby to provide an interlocking or "keystone" effect to prevent spreading of the washer, this construction further assuring surface-to-surface or contiguous contact at the opposite sides of the washer.

It is still a further object of the present invention to provide a novel lockwasher of the above character which will not tend to embed itself into the surface of the work in which it engages or into the adjacent side of the associated fastening means, thereby minimizing the possibility of losses in fastener loading.

Other objects and advantages of the present invention will become apparent from the following detailed description taken in conjunction with the accompanying drawings.

BRIEF DESCRIPTION OF THE DRAWINGS

FIG. 1 is a side elevational view, partially broken away, of a lockwasher incorporating the principles of the present invention;

FIG. 2 is a side elevational view, partially broken away, of the lockwasher illustrated in FIG. 1 in operative association with a pair of workpieces that are connected by means of an associated fastening member which is in a semi-tightened or seated configuration;

FIG. 3 is a view similar to FIG. 2 showing a lockwasher of the present invention and associated fastening means in a substantially tightened or seated condition;

FIG. 4 is a side elevational view, partially broken away, of a modified embodiment of a lockwasher incorporating the principles of the present invention;

FIG. 5 is a side elevational view, partially broken away, of the lockwasher illustrated in FIG. 4 in operative association with a pair of workpieces and associated fastening means which is in a semi-tightened or seated configuration;

FIG. 6 illustrates the lockwasher and associated fastening means shown in FIG. 5 in a substantially tightened or seated condition;

FIG. 9 is a view similar to FIG. 1 of another embodiment of the lockwasher of the present invention;

FIG. 10 is a side elevational view of the lockwasher illustrated in FIG. 9, as shown in operative association with a pair of workpieces and an associated fastening means having a nut mounted thereon, with the nut being in a semi-tightened or seated configuration;

FIG. 11 is a view similar to FIG. 10 showing the nut in a substantially tightened or seated condition;

FIG. 12 is a view similar to FIG. 9 of yet another embodiment of a lockwasher embodying the principles of the present invention;

FIG. 13 is a side elevational view of another embodiment of a lockwasher of the present invention, as shown in operative association with a pair of workpieces and an associated fastening means having a nut thereon which is in a semi-tightened or seated configuration, and FIG. 14 is a view similar to FIG. 13 showing the nut in a substantially tightened or seated condition.

DETAILED DESCRIPTION OF THE INVENTION

Figure 7:
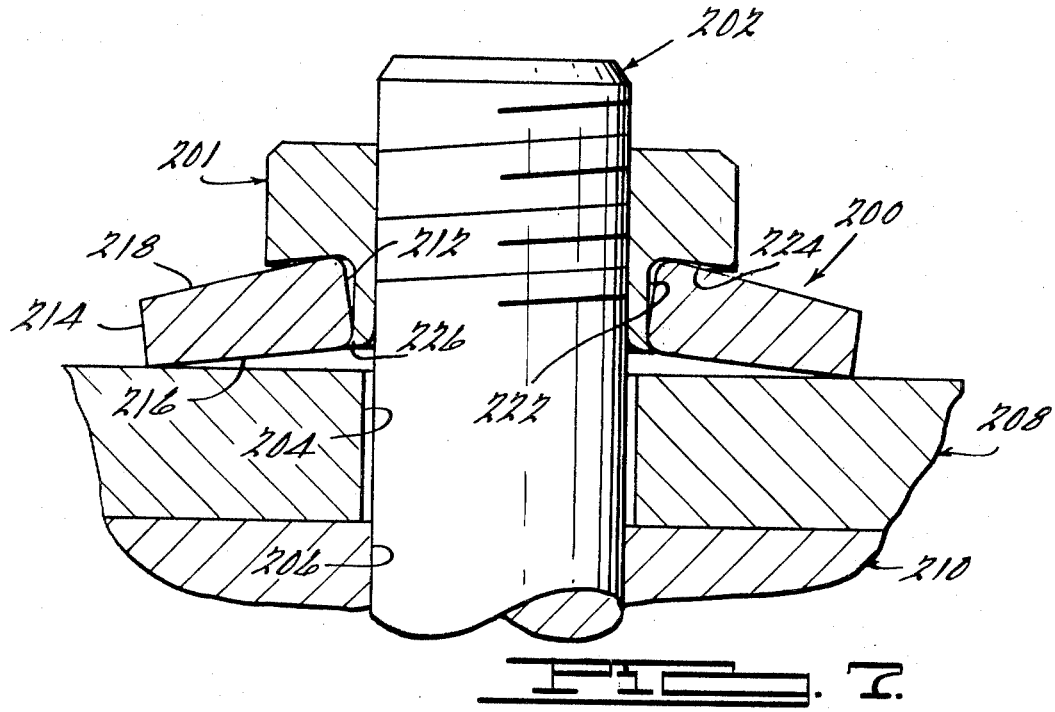
FIG. 7 is a cross-sectional view of a lockwasher embodying the principles of the present invention in operative association with a bolt and nut, the latter of which is in a semi-tightened or seated configuration.

Referring now to FIGS. 1 through 3 of the drawings, a lockwasher 10, constructed in accordance with the principles of the present invention, is shown in operative association with a bolt 12 comprising a generally polygonally configured head section 14 and a cylindrical shank section 16, the latter having a smooth upper portion 18 and an externally threaded lower portion 20. The shank portion 18 of the bolt 12 extends axially through an aperture 22 which is slightly larger in diameter than the portion 18 and is formed in a flat or planar workpiece 24. The bolt 12 functions to fixedly secure the workpiece 24 to an associated workpiece 26 by threadably engaging the lower end portion 20 thereof within an internally threaded aperture 28 in the workpiece 26. Generally speaking, the lockwasher 10 of the present invention is adapted to be interposed between the upper side of the workpiece 24 and the underside of the bolt head section 14 and function to maintain the fastener load applied to the workpieces 24, 26 by the bolt 12, in a manner hereinafter to be described.

By way of explanation, the distance T in FIG. 2 may be termed the grip thickness of the assembled workpieces 24 and 26. Normally, the bolt 12 securing the workpieces 24, 26 to one another is tightened until it reaches substantially its proof load, that is, the load assigned by engineering standards as that which a bolt of specified dimensions and material is capable of assuming without permanent deformation. In most instances, the thickness T will decrease in time due to such factors as embedding of the bolt 12 into the workpieces, yielding of foreign particles and thread surfaces, or surface irregularities between the bolt 12 and workpieces 24, 26, or the cold flow of the assembled members. This reduction in grip thickness will result in a reduction in elongation of the bolt 12 and thus a reduction in the remaining bolt load or face holding the workpieces 24, 26 together. This, of course, increases the possibility for relative movement between the workpieces 24 and 26 which may, under certain circumstances, cause repeated stressing of the bolt 12 increasing the possibility of fatigue failure. The lockwasher 10, in accordance with the present invention, is adapted to provide a relatively higher proportion of the fastener load to be retained upon a given reduction in the grip thickness T, as compared with the load which would be retained with other type lockwashers heretofore known and used.

Referring now in detail to the construction of a lockwasher 10, as best seen in FIG. 1, the washer 10 is formed of a single length of wire stock which is generally, although not necessarily, trapezoidal-shaped in cross section and defines coaxially arranged parallel inner and outer surfaces 30 and 32, and inclined spaced non-parallel upper and lower surfaces 34 and 36, respectively, which result in the washer 10 appearing to be generally frusto-conically shaped in side elevational view, as seen in FIG. 1. Preferably, the surface 34 and 36 slope at an angle of between approximately 3° and 8° from a plane transverse to the axis of the bolt shank section 16, with the slope of the upper surface being greater than that of the lower surface. The outer diameter of the lockwasher 10 is usually greater than the maximum diameter of the bolt's head section 14, i.e., greater than the distance across the flats of the bolt head. In situations where the diameter of the upper shank portion 18 is equal to or slightly larger than the diameter of the lower shank portion 20, the inner diameter of the lockwasher 10 may be slightly smaller than the diameter of the portion 18 when the washer 10 is in an unstressed condition, whereby the washer may be elastically expanded and inserted onto the shank portion 18 and be maintained thereon by a slight interference fit. This enables the washer 10 to be assembled on the bolt 12 and be positively maintained thereon without requiring that the threads, which in most instances are of a slightly larger outside diameter than the shank portion 18, be formed on the bolt 12, whereby to accommodate various assembly, packaging and stock handling practices. In situations where the diameter of the shank portion 18 is less than the diameter of the lower threaded portion 20, no interference fit between the inner diameter of the washer 10 and the shank portion 18 is necessary since the larger thread diameter retains the washer 10 on the bolt 12.

As best seen in FIG. 1, the lockwasher 10, together with being generally frusto-conical in shape, is of a generally helical configuration and is thus split at one radial portion thereof, the split defining a pair of flat radially directed face portions 38 and 40. By virtue of this split helical construction, the washer 10 of the present invention is adapted to be manufactured from wire stock on a conventional helical washer coiling machine rather than from flat strip stock which is stamped out. In the latter case, approximately 50% of the stock is lost as waste, whereas in the present case, there is virtually no waste nor any stamping or forming dies to maintain. It may be noted that in the manufacture of the lockwasher 10 by the aforesaid wire coiling technique, the wire stock may be initially formed such that the edge thereof which ultimately constitutes the radially outer edge of the washer 10 is slightly thicker than the opposite edge which constitutes the radially inner edge of the washer 10. The reason for this is that the edge of the wire that is formed into the outer edge of the washer 10 becomes slightly thinner upon being formed or coiled into the helical configuration of the finished washer 10 illustrated in FIG. 1. It may be noted that this technique constitutes no material part of the applicant's invention and is mentioned herein merely to clarify the descriptive portion of the specification.

As illustrated in FIG. 3, the underside of the bolt's head section 14 is formed with a frusto-conical surface portion 42 that is inclined upwardly toward the upper end of the shank portion 18 at preferably the same angle as the upper surface 34 of the lock washer 10, when the washer 10 is substantially tightened or seated, thus the underside of the bolt head section 14 is complementary in shape with respect to the upper side of the lockwasher 10, whereby to provide an interlocking or "keystone" effect between the bolt head section 14 and the washer 10. As the bolt 12 is tightened from the position illustrated in FIG. 2 to the position illustrated in FIG. 3, the complementary surfaces 34 and 42 prevent the washer 10 from spreading or deforming radially outwardly and thus maintain the superior locking action of the washer 10.

As best seen in FIG. 1, the radially directed slit formed in the lock washer 10 which defines the face portions 38 and 40 is preferably formed at an angle of approximately 7° or other appropriate angle from the axis of the bolt's shank section 16. With this construction, as the lockwasher 10 is compressed between the underside of the head section 14 and the upper surface of the workpiece 24, the radially directed face portions 38 and 40 cam against each other thereby causing the lockwasher 10 to spread or deform radially outwardly a small amount. Accordingly, the interference fit which is provided between the radially inner surface 30 of the lockwasher 10 and the outer periphery of the shank portion 18 of the bolt 12 is relieved so that the bolt 12 may be tightened against the upper surface of the workpiece 24 without interference. The above angular construction of the radial slit defining the face portions 38 and 40 also assures that these face portions are in firm contact with one another upon tightening of the bolt 12, whereby to assure that the conical locking action of the lockwasher 10 is maintained.

In a preferred construction of the lockwasher 10 of the present invention, the slit defining the radially directed face portions 38 and 40 is formed by shearing the wire stock from which the washer 10 is constructed in an axial direction. The reason for this is that when the wire stock is sheared, the sheared ends tend to spread slightly. It has been found that if the shearing is done in an axial direction, the spread will be in a radial direction and, conversely, if the shearing is done in a radial direction, the spread will be in an axial direction. Since it is undesirable to have any spread in the axial direction due to the fact that such spreading minimizes area contact between the confronting surfaces of the workpiece 24 and the underside of the bolt head section 14, the shearing should be done in an axial direction, resulting in the spread being in a radial direction which is of no appreciable consequence.

Upon assembling the bolt 12 with the lockwasher 10 operatively mounted thereon, the bolt 12 is tightened to approximately its assigned elastic proof load, from the position illustrated in FIG. 2 to the position illustrated in FIG. 3, whereby the lower surface portion 36 of the lock washer 10 will be flattened against the upper surface of the workpiece 24. Upon a reduction in the grip thickness T, the lockwasher 10 will tend to return toward its original unstressed shape illustrated in FIG. 2, and in doing so will maintain to a substantial extent, the proof load on the bolt 12 and therefore the force tending to hold the workpieces 24 and 26 together.

Referring now to FIGS. 4 through 6, a lockwasher 100, constructed in accordance with a modified embodiment of the present invention, is shown in operative association with a bolt 102 and workpieces 104 and 106. The lockwasher 100 is substantially identical in construction and operation to the hereinbefore described lockwasher 10, with the exception that the upper surface 108 thereof is formed with an annular upwardly projecting shoulder portion 110 adjacent its radially inner side, herein designated by the numeral 112 and corresponding to the surface 30 of the lockwasher 10. The surface 108, together with a corresponding lower surface 114 which is analogous to the surface 36 of the lockwasher 10, is preferably sloped at an angle of approximately 3° to 8° from a plane transverse to the axis of the bolt 102, as described in connection with the lockwasher 10.

As seen in FIGS. 5 and 6, the underside of the bolt's head section, designated by the numeral 116, terminates at its radially inner edge in an upwardly extending annular recess 118 which is complementary to and is adapted to contiguously receive the shoulder portion 110 of the lockwasher 100, such that the hereinbefore described interlocking or "keystone" effect is provided between the bolt's head section 116 and the lock washer 100. With this construction, upon tightening the bolt 102 relative to the upper side of the workpiece 104, radially outward deformation or spreading of the lockwasher 100 is prevented so that the desirable locking action thereof is maintained.

Figure 8:
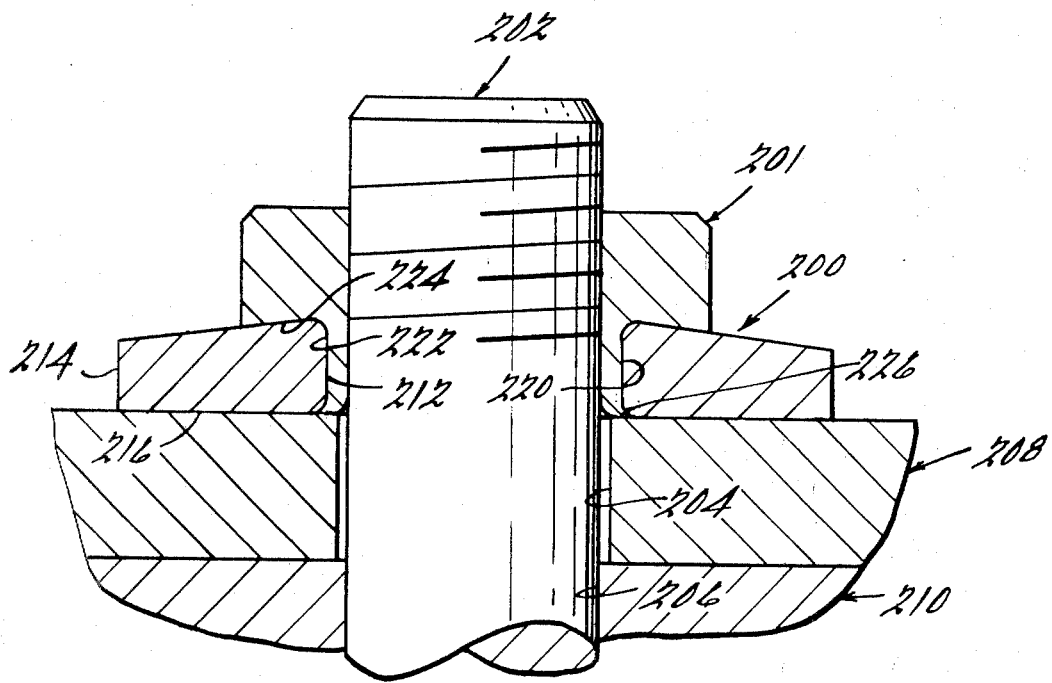
FIG. 8 is a view similar to FIG. 7 showing a lockwasher of the present invention and associated nut in a substantially tightened or seated condition.

Referring now to FIGS. 7 and 8, a lockwasher 200 is shown in operative association with a nut 201 that is threaded on the upper end of a bolt or stud 202 which extends through suitable apertures 204 and 206 in a pair of workpieces 208 and 210. The lockwasher 200 may be constructed on the above described type of helical washer coiling machine and includes coaxially arranged parallel inner and outer surfaces 212 and 214, a flat lower surface 216 and a radially outwardly and downwardly inclined upper surface 218. The diameter of the nut 201 is preferably smaller than the outside diameter of the lockwasher 200, the nut 201 being formed with an annular recessed portion 220 around the lower end thereof for the support of the washer 200. More particularly, the recessed portion 220 is defined by an axially extending cylindrical wall 222 which terminates at its upper end in a radially outwardly and downwardly inclined surface portion 224. Preferably the diameter of the wall 222 is slightly smaller than the inside diameter of the washer 200 and the surface portion 224 is preferably inclined at substantially the same angle as the upper surface 218 of the lockwasher 200 when the latter is in a substantially tightened or seated condition shown in FIG. 8, whereby the surfaces 224 and 218 are complementary in shape to provide the aforedescribed interlocking or "keystone" effect between the lockwasher 200 and nut 201.

The lockwasher 200 is secured to the lower side of the nut 201 and more particularly the inner peripheral portion of the washer 200 is retained within the recessed portion 220 of the nut 201 by flaring or feathering the lower end section of the nut 201 radially outwardly in a manner such that at least a small portion of the lower end of the nut 201 underlies or extends radially outwardly beneath the inner peripheral section of the lockwasher 200, as indicated at 226 in FIGS. 7 and 8. It may be noted that prior to flaring the lower end of the nut 201, as above described, the washer 200 is first compressed sufficiently in an axial direction to remove the helix therefrom, the washer 200 thereafter being assembled onto the nut 201 and being permanently maintained thereon in a substantially non-helical configuration.

Upon assembling the unitized assembly comprising the nut 201 and lock washer 200 on the stud 202, the nut 201 is tightened until the stud 202 reaches its approximate elastic proof load, from the position illustrated in FIG. 7 to the position illustrated in FIG. 8, whereby the lower surface portion 216 of the washer 200 will be flattened against the upper surface of the workpiece 208. Upon a reduction in the grip thickness, the lockwasher 200 will tend to return toward its original unstressed shape illustrated in FIG. 7, and in doing so will maintain to a substantial extent, the proof load on the stud 202, as above described.

FIG. 9 illustrates another embodiment of the lockwasher of the present invention which is generally designated by the numeral 300. The lockwasher 300 is formed with radially spaced inner and outer surface portions 302 and 304 and with axially spaced upper and lower surface portions 306 and 308. As illustrated, the inner and outer surface portions 302, 304 extend radially outwardly and upwardly relative to the axis of the lockwasher 300, while the upper and lower surface portions 306, 308 extend radially inwardly and upwardly with respect to the axis of the lockwasher 300. In a preferred construction of the lockwasher 300, the surface portions 302, 304 are parallel, as are the surface portions 306, 308, with the inner and outer surface portions 302, 304 being perpendicular or lying at right angles with respect to the surface portions 306 and 308, resulting in the lockwasher 300 being substantially rectangular-shaped in transverse cross section.

The lockwasher 300 is formed with a radially directed slit and assumes a generally helical configuration in an unstressed condition in substantially the same manner as the hereinabove described lockwasher 10, with the slit defining a pair of radially extending abuttingly engageable surfaces 310 and 313. As illustrated in FIGS. 10 and 11, the lockwasher 300 is adapted to be operatively associated with a pair of workpieces 312 and 314 which are secured together by means of a suitable mounting stud or bolt 316 having an externally threaded upper end portion 318 upon which a conventional nut or the like 320 is threadably received. The stud 316 is adapted to extend through a pair of coaxially aligned openings or bores 322 and 324 formed in the workpieces 312, 314, respectively, with the lockwasher 300 being interposed between the lower side of the nut 320 and the adjacent side of the workpiece 312.

In accordance with the principles of the present invention, the workpiece 312 is formed with an annular recessed portion or counterbore 326 which is located coaxially of the bores 322, 324. The size of the counterbore 326 is selected to be substantially equal in diameter to the size of the lockwasher 300 when said lockwasher 300 is disposed in a substantially stressed condition, as illustrated in FIG. 11, whereby the outer peripheral edge portion 328 of the counterbore 326 will function as a means for preventing radially outward expansion of the lockwasher 300 upon tightening of the nut 320 on the end portion 318 of the stud 316.

As will be apparent, upon assembly of the workpieces 312, 314, the stud 316 is initially inserted through the bores 322, 324 and the lockwasher 300 is surmounted over the end portion 318 of the stud 316 and nestingly received within the counterbore 326, as illustrated in FIG. 10. Thereafter, the nut 320 is threadably advanced along the stud 316, whereby to compress the lockwasher 300 a slight amount and thereby remove the helix therefrom, with the result that the lockwasher 300 will assume the conical configuration shown in FIG. 10. Upon further advancement of the nut 320, the lock washer 300 will be compressed or "flattened" to the position shown in FIG. 11, with the edge portion 328 functioning to prevent the lockwasher 300 from expanding radially outwardly in the same manner as the inclined surface portion 42 of the bolt 12, whereby the lockwasher 300 will function to positively maintain the nut 320 in the tightened or seated position shown in FIG. 11.

FIG. 12 illustrates yet another embodiment of the present invention wherein a lockwasher 400 is shown as comprising radially spaced inner and outer surface portions 402 and 404, respectively, and axially spaced upper and lower surface portions 406 and 408, respectively. The surface portions 402 and 404 are preferably parallel to one another and extend radially inwardly and upwardly relative to the axis of the lockwasher 400, and in a similar manner, the surface portions 406 and 408 are parallel to each other and extend radially inwardly and upwardly relative to the axis of the lockwasher 400. The lockwasher 400 is formed with a radially directed slit that defines abuttingly engageable end portions 410 and 412 which are adapted to engage one another in the same manner as the face portions 38 and 40 of the lockwasher 10. The lockwasher 400 is substantially identical in construction and operation to the lockwasher 300, with the exception that the surface portions 402, 404 are not arranged at right angles with respect to the surface portions 406, 408, with the result that the lockwasher 400 is generally parallelogram-shaped in transverse section instead of being rectangular in shape as is the lockwasher 300.

FIGS. 13 and 14 illustrate the hereinabove described lockwasher 10 in operative association with a pair of workpieces 500 and 502 which are adapted to be secured to one another by means of a suitable bolt or stud member 504 having an externally threaded upper end portion 506. The stud member 504 extends through coaxially aligned openings or bores 508 and 510 formed in the workpieces 500 and 502, respectively, and a suitable nut 512 is threadably received upon the upper end portion 506 of the stud 504. As previously described, the lockwasher 10, when in an unstressed condition, assumes a generally helical configuration, with the upper and lower surfaces 34 and 36 extending radially inwardly and upwardly, with the result that when the nut 512 is threadably advanced along the end portion 506 of the stud 504, the helix of the lock washer 10 will be removed or "flattened" as the adjacent end portions thereof move into substantial axial alignment, with the result that the lock washer 10 will thereafter assume the conical configuration illustrated in FIG. 13. Upon further tightening of the nut 512, the lockwasher 10 will be biased from the position illustrated in FIG. 13 to the position shown in FIG. 14 wherein the lower surface portion 36 thereof contiguously engages a surface portion 514 defined by the upper side of the workpiece 500.

It will be noted that although the underside of the nut 512 is not formed with any radially outwardly and downwardly inclined surface adapted to contiguously engage the inclined upper surface portion 34 of the lockwasher 10, and further that the workpiece 500 is not formed with any counterbore or the like such as the counterbore 326 illustrated in FIGS. 10 and 11, it is contemplated that when the lockwasher 10 is of sufficient size in both the axial and radial dimensions, the inherent strength of the lockwasher 10 itself will prevent any radial expansion thereof upon tightening of the nut 512 from the position shown in FIG. 13 to the position shown in FIG. 14. Accordingly, use of the lockwasher 10 is not necessarily limited to operative association with a bolt head or nut having means thereon for preventing radial expansion of the lockwasher, or to an application wherein the adjacent workpiece is provided with a counterbore or similar functioning means for limiting radial outward expansion of the lockwasher. Thus, for certain applications the lockwasher 10, as well as either of the lockwashers 200, 300 or 400, of the present invention, may find particularly useful application in operative association with conventional bolts, studs, and nuts and function in a manner hereinabove described in positively and effectively maintaining the proof load on such bolts, studs or nuts.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In combination in an assembly for fastening first and second members together, means on said first member defining a threaded aperture, means on said second member defining an enlarged head portion and a shank portion adapted to be threadably received within said aperture, a lock washer interposed between said head portion and said means defining said aperture for limiting relative movement between said members, said lock washer being formed with a radially directed slit at a predetermined angle to the axis of said lock washer, whereby the end portions of said lockwasher define inclined abuttingly engageable surfaces which are axially offset when said lockwasher is in a substantially unstressed condition.

said lockwasher further having radially spaced inner and outer surface portions and upper and lower surface portions and assuming a generally helical configuration in an unstressed condition, said upper and lower surface portions being inclined radially inwardly and upwardly and said inner and outer surface portions being inclined radially outwardly and upwardly whereby said lock washer assumes a generally conical configuration when said end portions thereof are biased into substantial axial alignment, and means on one of said members engageable with one of said surface portions of said lock washer for limiting radially outward expansion thereof as said head portion of said second member is moved toward said first member, said last mentioned means defining a surface engageable with said one surface and disposed at a lesser angle relative to the axis of said second member than the inclination of said one surface relative to said axis.

2. An assembly as defined in claim 1 wherein said means on one of said members for limiting radially outward expansion of said lock washer comprises a counterbore on said first member arranged coaxially of said aperture and adapted to engage said outer surface portion of said lock washer as said head portion of said second member is moved toward said first member.

3. An assembly as defined in claim 2 wherein said radially spaced inner and outer surface portions are arranged substantially perpendicular to said upper and lower surface portions, whereby said lock washer is substantially rectangular-shaped in transverse section.

4. An assembly as defined in claim 1 wherein said means for limiting radially outward expansion of said lock washer comprises a radially outwardly and downwardly inclined surface portion formed on the lower side of said head portion and adapted to contiguously engage said upper surface portion of said lock washer as said head portion of said second member is moved toward said first member.

5. An assembly as defined in claim 1 wherein the underside of said head portion defines a radially outwardly and downwardly inclined surface portion, wherein said upper surface portion of said lock washer extends at a relatively acute angle to said inclined surface portion on said head portion when said lock washer is in an unstressed condition, wherein said inner and outer surface portions assume a substantially cylindrical configuration parallel to said lock washer axis, and said upper surface portion assumes an angle complementary that of said inclined surface portion on said head portion when said lock washer is in a stressed condition, said upper surface portion and said inclined surface portion on said head portion cooperating to prevent said lock washer from deforming radially outwardly when said second member is moved toward said first member.

6. An assembly as defined in claim 1 wherein said second member comprises a bolt having an elongated cylindrical shank section terminating at one end in an enlarged head section, the underside of said head section defining a radially outwardly and downwardly inclined surface portion, and wherein said upper surface portion of said lock washer and said underside of said head section are complementary in shape and continguously engageable to prevent said lock washer from deforming radially outwardly when said head section of said bolt is moved axially toward said first member.

7. An assembly as defined in claim 1 wherein said head portion of said second member comprises a nut adapted to be threadably secured on said shank portion of said second member, said nut having a lower surface portion inclined radially outwardly and downwardly at substantially the same angle of said upper surface portion of said lock washer when said lock washer is in a substantially stressed condition.

8. An assembly as defined in claim 1 wherein said second member comprises a bolt having an elongated cylindrical shank section terminating at one end in an enlarged head section, the underside of said head section defining a radially outwardly and downwardly inclined surface portion, wherein said upper surface portion of said lock washer extends at a relatively acute angle to said inclined surface portion on said head section when said lock washer is in an unstressed condition, and wherein said inner and outer surface portions assume a substantially cylindrical configuration parallel to said lock washer axis and said upper surface portion assumes an angle complementary to that of said inclined surface portion on said head section when said lock washer is in a stressed condition, said upper surface portion and said inclined surface portion on said head section cooperating to prevent said lock washer from deforming radially outwardly when said head section of said bolt is moved toward said first member.

9. An assembly as defined in claim 1 wherein said head portion of said second member comprises a nut adapted to be threadably secured to said shank portion of said second member, said nut having a lower surface portion inclined radially outwardly and downwardly, wherein said upper surface portion of said lock washer extends at a relatively acute angle to said inclined surface portion on said nut when said lock washer is in an unstressed condition, and wherein said inner and outer surface portions assume a substantially cylindrical configuration parallel to said lock washer axis and said upper surface portion assumes an angle complementary to that of said inclined surface portion on said nut when said lock washer is in a stressed condition, said upper surface portion and said inclined surface portion on said nut cooperating to prevent said lock washer from deforming radially outwardly when said nut is moved toward said first member.

10. An assembly as defined in claim 1 wherein said second member comprises a bolt having an elongated shank section terminating at one end in an enlarged head section, and wherein the inner diameter of said lock washer is slightly smaller than the diameter of said shank section whereby said lock washer is clampingly engaged with the outer periphery of said shank section when said lock washer is in an unstressed condition, with the inner diameter of said lock washer being slightly greater than the diameter of said shank section when said lock washer is in a stressed condition.

11. An assembly as defined in claim 1 wherein said shank portion of said second member comprises a stud member and wherein said head portion of said second member comprises a nut adapted to be threadably received on said stud member, the underside of said nut being formed with an axially extending cylindrical surface portion and with a radially inwardly and upwardly inclined surface portion, said surface portions of said nut defining an annular recess around the underside thereof, and wherein the inner diameter of said lock washer is slightly greater than the diameter of said cylindrical surface portion, said upper surface portion of said lock washer being complementary to said radially inwardly and upwardly inclined surface portion of said nut, and which includes a radially outwardly flared portion on the lower end of said nut for maintaining said lock washer in a partially stressed condition wherein said end portions thereof are substantially axially aligned.

12. An assembly as defined in claim 1 wherein the underside of said head portion is formed with a radially extending surface portion defining an axially upwardly extending annular recess at the radially innermost portion thereof, and wherein said upper surface portion of said lock washer is provided with an axially extending annular shoulder portion complementary to and engageable with said recess in said head portion for preventing said lock washer from deforming radially outwardly when said head portion is moved axially toward said first member.

13. A lock washer comprising a length of wire formed into a helical configuration, said lock washer being formed with a radially directed slit at a predetermined angle away from the axis of said lock washer, whereby the end portions of said lock washer define inclined abuttingly engageable surfaces which are axially offset when said lock washer is in a substantially unstressed condition, said lock washer having radially spaced inner and outer surface portions inclined radially outwardly and upwardly relative to the axis of said lock washer, and axially spaced upper and lower surface portions joining the axial extremities of said inner and outer surfaces, said upper and lower surface portions being inclined radially inwardly and upwardly when said lock washer is in a substantially unstressed and partially stressed condition, whereby said lock washer assumes a generally conical configuration when said end portions thereof are biased into substantial axial alignment, with said lower surface portion being biased to a position substantially perpendicular to the axis of said lock washer when the same is in a substantially stressed condition, said upper and lower surface portions being inclined radially inwardly and upwardly toward the axis of said lock washer, with the angle of said upper surface portion being greater than that of said lower surface portion, said upper and lower surface portions each forming acute angles with said inner surface portion and obtuse angles with said outer surface portion.

References Cited

UNITED STATES PATENTS

| | | | |
|---|---|---|---|
| 329,738 | 11/1885 | Harvey | 151—36 |
| 982,763 | 1/1911 | Blakey | 151—36 |
| 1,908,215 | 5/1933 | Berge | 151—36X |
| 1,929,808 | 10/1933 | Cataline | 151—36X |
| 2,449,846 | 9/1948 | Gilman | 151—38X |
| 2,779,376 | 1/1957 | Poupitch | 151—37 |
| 1,655,018 | 1/1928 | Loutrel | 151—36 |

OTHER REFERENCES

Railroad Gazette, "The National Lock Washer," Mar. 30, 1888.

RAMON S. BRITTS, Primary Examiner

U.S. Cl. X.R.

151—37